3,401,134
POLYMER LATICES OF HIGH VISCOSITY
Joel Fantl, Frank J. Hahn, and John F. Heaps, Springfield, and Charles R. Williams, Longmeadow, Mass., assignors to Monsanto Company, St. Louis, Mo., a corporation of Delaware
No Drawing. Continuation-in-part of application Ser. No. 161,301, Dec. 21, 1961. This application Sept. 24, 1964, Ser. No. 399,062
The portion of the term of the patent subsequent to Jan. 3, 1984, has been disclaimed
3 Claims. (Cl. 260—29.6)

This invention relates to novel emulsion polymerized latices.

This application is a continuation-in-part of our co-pending application Ser. No. 161,301, filed Dec. 21, 1961, and now abandoned.

The use of polymer latices such as latices of styrene-butadiene copolymers, polyvinyl acetate, acrylate ester polymers and the like in the manufacture of water-based coating compositions is well known in the art. The common method of applying such coating compositions, e.g., by brushing or rolling, requires that the coating composition have a sufficiently high viscosity to enable its convenient transfer from the container to the surface being painted. To attain the desired viscosity, thickening agents such as cellulose ethers and water-soluble gums are customarily added to the coating compositions. It is recognized in the art that the use of such thickening agents is not desirable, but to date their use has been a practical necessity to obtain desired viscosities. In particular, the more effective thickening agents customarily employed cause flocculation of the dispersed polymer and depend upon flocculation to increase the viscosity. As a result, the paint exhibits rheology conducive to easy application, but sacrifices package homogeneity, leveling, gloss, bonding to chalked paint surfaces, exterior durability and film-thickness. Avoidance of flocculation is essential to obtain latex paints which will deposit glossy films. In view of the foregoing, it obviously would be desirable to have available to the art polymer latices which either have high viscosities as prepared or whose viscosities can be increased significantly without adding thickeners thereto.

It is an object of this invention to provide a novel emulsion polymerized latex.

Another object of this invention is to provide a novel polymer latex which will thicken upon being adjusted to a pH on the basic side.

Other objects and advantages of the invention will be apparent from the following detailed description thereof.

Briefly, the above and related objects are attained by polymerizing particular monomer mixtures by particular emulsion polymerization process steps. Specifically, monomer mixtures consisting of an alpha,beta-ethylenically unsaturated carboxylic acid and at least one vinylidene monomer are polymerized in such a manner that the addition of a specific amount of the carboxylic acid monomer to the polymerization reaction is delayed until at least about 70 weight percent of the total monomer mixture has been polymerized. The latex so produced consists of polymer particles which have an inner polymer composition with a polymer composition oriented to the surface of the polymer particles and wherein the polymer composition oriented to the surface contains the alpha,-beta-ethylenically unsaturated carboxylic acid. The latices, when adjusted to a pH of about 8–12, increase significantly in viscosity and films laid down therefrom are clear and glossy. When the latices are formulated with suitable pigments and rendered alkaline, coating compositions of brushable and rollable consistency are obtained. The films laid down from such coating compositions can be either flat or moderately glossy, depending upon the type and amount of pigments incorporated therein.

The following examples are set forth to illustrate more clearly the principle and practice of this invention to those skilled in the art and unless otherwise noted where parts or quantities are mentioned, they are parts or quantities by weight.

EXAMPLE I

An approximately 45% solids latex of an interpolymer of 48.5% styrene, 39% 2-methyl hexyl acrylate, 6% acrylontrile and 6.5% methacrylic acid is prepared by a modification of the process described in Example I of U.S. 2,767,153. The following solutions are prepared.

Kettle charge

| Component: | Parts |
|---|---|
| Water (distilled) | 402 |
| Triton X–100 [1] | 1.7 |
| Triton X–770 [2] | 1.2 |
| Tetrasodium pyrosphoate | 0.2 |

[1] Ethylene oxide condensate of nonylphenol.
[2] Sodium salt of an alkyl aryl polyether sulfate.

Catalyst and emulsifier premix

| Component: | Parts |
|---|---|
| Water (distilled) | 132 |
| Triton X–100 | 0.5 |
| Triton X–770 | 10.7 |
| Potassium persulfate | 2.7 |

Monomer charge I

| Component: | Parts |
|---|---|
| Acrylonitrile | 24 |
| Styrene | 56 |

Monomer charge II

| Component: | Parts |
|---|---|
| Styrene | 138 |
| 2-ethylhexyl acrylate | 125 |

Monomer charge III

| Component: | Parts |
|---|---|
| 2-ethylhexyl acrylate | 31 |
| Methacrylic acid | 26 |

The kettle charge is added to a glass-lined reaction vessel that is fitted with a reflux condenser and a stirrer and refluxed (at atmospheric pressure) for 15 minutes to deoxygenate the solution. There is then added to the reaction vessel 10 parts of the catalyst and emulsifier premix. The balance of the catalyst and emulsifier premix is added to the reaction vessel at a uniform rate of 1.3 parts per minute, the total time of addition being 100 minutes. As soon as the initial aliquot of the catalyst and emulsifier premix is added to the reaction vessel, monomer charge I is added to the reaction vessel at a uniform rate of 2 parts per minute, the time of addition for this monomer charged being about 30 minutes. Immediately thereafter, monomer charge II is added to the reaction vessel at a uniform rate of 5.5 parts per minute, the total time of addition of this monomer charge being about 50 minutes. Immediately thereafter, monomer charge III is added to the reaction vessel at a uniform rate of 5 parts per minute, the addition of monomer charge III requiring approximately 10 minutes. Reflux is continued for an additional 15 minutes to polymerize the final traces of monomers. Reflux is then continued for an additional 15 minutes and 60 parts of distillate are removed so as to remove by steam distillation any residual monomers present in the latex. The resulting latex is subsequently identified as Latex A.

The catalyst concentration and monomer addition times described in the paragraph above are selected so that the monomers polymerize at substantially the rate they are added to the reaction vessel. It will be specifically noted that the acid monomer, i.e., methacrylic acid, is not introduced into the polymerization reaction until approximately 85% of the total monomer charge has been polymerized. The amount of acid in the polymer oriented to the surface of the particles so produced constitutes about 45.5% of the polymer so oriented to the surface.

EXAMPLE II

An approximately 45% solids latex of an interpolymer of 40.5% styrene, 49% of 2-ethylhexyl acrylate, 6% acrylonitrile and 4.5% of methacrylic acid is prepared by the emulsion polymerization reaction employed in Example I except that the kettle and monomer charges are as follows:

Kettle charge

| Component: | Parts |
|---|---|
| Water (distilled) | 402 |
| Triton X–100 | 1.7 |
| Triton X–770 | 1.2 |
| Tetrasodium pyrophosphate | 0.2 |

Catalyst and emulsifier premix

| Component: | Parts |
|---|---|
| Water (distilled) | 132 |
| Triton X–100 | 0.5 |
| Triton X–770 | 10.7 |
| Potassium persulfate | 2.7 |

Monomer charge I

| Component: | Parts |
|---|---|
| Styrene | 14 |
| Acrylonitrile | 6 |

Monomer charge II

| Component: | Parts |
|---|---|
| Styrene | 26 |
| 2-ethylhexyl acrylate | 24 |

Monomer charge III

| Component: | Parts |
|---|---|
| 2-ethylhexyl acrylate | 25.5 |
| Methacrylic acid | 4.5 |

It will be specifically noted that the monomers so added to the reaction kettle are added at such a rate that they polymerized at a rate substantially equal to the rate at which they were added to the reaction vessel. It will be further noted that the acid, which constitutes 4½% of the total monomer charge is not added until about 70% of the total monomer charge has been polymerized. The amount of acid in the polymer oriented to the surface of the particles so produced constitutes about 15% thereof.

EXAMPLE III

Example II is repeated except that in place of monomer charge III of Example II the following monomer charge is employed:

Monomer charge III

| Component: | Parts |
|---|---|
| 2-ethylhexyl acrylate | 24.5 |
| Methacrylic acid | 5.5 |

It will be noted that the acid monomer which constitues 5½% of the total monomer charge is not added until about 70% of the total monomer charge is first polymerized. The amount of acid in the polymer oriented to the surface of the particles so produced constitutes about 18.3% thereof.

EXAMPLE IV

The latices prepared in Examples I–III are diluted to 28% solids. The viscosity of the samples is measured and found to be less than 10 cps. The pH of the latices are then adjusted to about 9.0 with ammonium hydroxide. After standing for about 1 hour, the viscosities are measured again and are as follows:

| | Cps. |
|---|---|
| Example I | >2000 |
| Example II | <10 |
| Example III | >2000 |

It will be noted that the latex containing only 15% of acid in the polymer composition oriented to the surface of the particles did not increase in viscosity when adjusted to a pH of about 9.0. The core contains 70% of the monomer mixture.

This invention is directed to an emulsion polymerized latex of (A) an alpha,beta-ethylenicaly unsaturated carboxylic acid and (B) at least one vinylidene monomer wherein the polymer particles comprise an inner polymer composition with a particular polymer composition orineted to the surface of the polymer particles. The polymer particles of the latex can probably be visualized as having a shell-core configuration. The inner polymer composition of the polymer particles of this invention consist of at least 70 and preferably 70–90 weight percent based on the total weight of the polymer particles of a polymer selected from the group consisting of homopolymers or interpolymers of at least one vinylidene monomer. The particular polymer composition oriented to the surface of the polymer particles consist of an interpolymer of 18–75 weight percent of (A) based on the weight of the oriented polymer with the balance thereof being (B). Preferably, the acid monomer constitutes 5.5–20 weight percent and more particularly 8–15 weight percent based on the total weight of the polymer. Stated in another way, the acid monomer used in providing the polymer composition oriented to the surface of the polymer particles preferably constitutes about 20–65 weight percent and more particularly about 25–50 weight percent based on the weight thereof. In the practice of this invention the polymer particles so prepared have a particle size of 0.01–1.0 and preferably 0.1–0.5 micron.

The critical feature of this invention is that the polymer composition oriented to the surface of the polymer particles must contain the proportion of the carboxylic acid set forth above. It is this critical feature and the makeup of the polymer particles that provides the unique property of a latex increasing in viscosity containing these particles when the latex is adjusted to a pH of 8–12 and preferably 8.0–10. This unique property results in a latex which when applied to a surface or when compounded with other ingredients provides a surface coating having excellent gloss, excellent hideability and excellent application properties.

In the practice of this invention, it is conceivable that the polymer composition of the inner polymer can contain carboxylic acid. The critical feature is as stated above in that the polymer oriented to the surface of the particles must contain 18–75 weight percent of carboxylic acid.

The acid monomers employed contain alpha,beta-ethylenic unsaturation and preferably a single carboxyl group. Typical examples of such preferred acid monomers are acrylic acid, methacrylic acid, crotonic acid, etc. Other acid monomers which can be employed include maleic acid, itaconic acid, and half esters of maleic acid and fumaric acid such as monomethyl maleate, monobutyl maleate, monododecyl maleate, monobutyl fumarate, etc.

The vinylidene monomers employed in the practice of this invention and which can be interpolymerized with the carboxylic acid monomer can be any vinylidene monomer as mono- and di-olefins, e.g., ethylene, propylene, isobutylene, butadiene, isoprene, etc.; vinyl halides, e.g., vinyl chloride, vinyl bromide, etc.; vinylidene halides, e.g., vinylidene chloride; esters of vinylidene monocarboxylic acids with 1–18 carbon atom monohydric alcohols, e.g., methyl acrylate, methyl alpha-chloroacrylate, butyl acrylate, benzyl acrylate, dodecyl acrylate, the corresponding esters of methacrylic acid, etc.; amides and nitriles of vinylidene monocarboxylic acids, e.g., acrylamide, methacrylamide, acrylonitrile, methacrylonitrile, etc.; vinylidene aromatic hydrocarbons and nuclear alkyl and halogen derivatives thereof, e.g., styrene, vinyl naphthalene, alpha-methylstyrene, vinyl toluene, 2,4-dimethylstyrene, o-, m-, p-chlorostyrene, 2,5-dichlorostyrene, 2-methyl-4-chlorostyrene, etc.; vinyl esters of 1–18 carbon monocarboxylic acids such as vinyl acetate, vinyl stearate, and vinyl benzoate, etc. Diesters of maleic acid and fumaric acid with 1–18 carbon atom monohydric alcohols, while not vinylidene monomers in the strict sense of the word, can be used interchangeably therewith. Typical examples of such monomers are diethyl maleate, dibutyl fumarate, etc. In the practice of this invention, homopolymers and interpolymers of the above can be employed to prepare the inner polymer composition of the polymer particles. Preferably, the interpolymer prepared herein to form the inner polymer composition of the polymer particles is selected from the group consisting of homopolymers and interpolymers of styrene wherein the interpolymers contain at least 50 weight percent of styrene with the balance being any monomeric compound which is interpolymerizable therewith.

In the broadest aspect of the invention, the acid monomer can be polymerized with any vinylidene monomer or any mixture thereof set forth in the paragraph above to form the shell of the polymer particles. Preferably, however, the latices are prepared from monomers which will provide polymers having second order transition temperatures not higher than about 50° C. The selection of monomers meeting this requirement is well within the skills of the art. Typical monomer compositions which can be employed to prepare the latices of the invention are set forth below:

(a) 80–95% methyl acrylate/5.5–20% acrylic and/or methacrylic acid,
  (b) 80–95% butyl acrylate/5.5–20% acrylic and/or methacrylic acid,
  (c) 25–65% styrene/3–10% acrylonitrile/35–60% 2-ethylhexyl acrylate/5.5–20% acrylic and/or methacrylic acid,
  (d) 25–60% styrene/3–10% acrylonitrile/35–60% dibutyl fumarate/5.5–20% acrylic and/or methacrylic acid,
  (e) 25–50% styrene/30–40% ethyl acrylate/5.5–20% acrylic and/or methacrylic acid,
  (f) 25–60% methyl methacrylate/3–10% acrylonitrile/35–60% 2-ethylhexyl acrylate/5.5–20% acrylic and/or methacrylic acid,
  (g) 80–95% vinyl acetate/5.5–20% acrylic and/or methacrylic acid,
  (h) 80–95% vinyl acetate/5.5–20% crotonic acid,
  (i) 20–95% butadiene/0–75% styrene/5.5–20% acrylic and/or methacrylic acid,
  (j) 20–95% butadiene/0–75% acrylonitrile/5.5–20% acrylic and/or methacrylic acid,
  (k) 20–95% butadiene/0–75% methyl methacrylate/5.5–20% acrylic and/or methacrylic acid,
  (l) 40–75% vinyl chloride/15–55% vinyl acetate/5.5–20% acrylic and/or methacrylic acid,
  (m) 40–75% vinyl chloride/15–55% ethyl acrylate/5.5–20% acrylic and/or methacrylic acid,
  (n) 40–75% vinyl chloride/15–55% dibutyl fumarate/5.5–20% acrylic and/or methacrylic acid.

The monomers can be polymerized by any of the known emulsion polymerization processes provided only that the addition of a specific weight percent of the carboxylic acid monomer to the polymerization reaction is delayed until at least about 70 weight percent of the total monomers have polymerized. Of necessity, the monomers are charged to the polymerization reaction in two or more separate monomer charges. In the preferred embodiment of the invention, the vinylidene monomers, which constitute 70–90 weight percent of the total monomers are emulsified in water containing a polymerization initiator and polymerized. The acid monomer, preferably in admixture with a small quantity of the vinylidene monomer, is then added to the polymerization medium and the polymerization is completed. In another embodiment of the invention the monomers are added continuously to the polymerization reaction at essentially the rate at which the added monomers will polymerize.

In preparing latices from monomers of two or more vinylidene monomers, one of which normally gives polymers having a high second order transition temperature (e.g., styrene, acrylonitrile or methyl methacrylate) and one of which normally gives polymers having a low second order transition temperature (e.g., an alkyl acrylate, a dialkyl maleate or a dialkyl fumarate), it is preferred to employ a special modification of the continuous monomer addition process. Specifically, the vinylidene monomer giving polymers of high second order transition temperature should be charged first, followed by the vinylidene monomer giving polymers of low second order transition temperature and finally by the acid monomer. Example I illustrates this embodiment of the invention. Pigmented coating compositions prepared from such latices offer an optimum combination of ease of application, quick drying and film-durability.

The emulsifying agents, polymerization initiators, polymerization modifiers, etc., that are employed in the polymerization process of the present invention are those commonly used in known prior art emulsion polymerization processes.

The latices of the present invention differ from prior art latices of polymers prepared from identical monomer mixtures primarily in developing unusually high viscosities at pH values in the range of 8–12 and preferably 8–10. The freeze-thaw stability of the latices of the invention is also outstanding. Other properties of the latices and the films prepared thereby are in general similar to those which would be predicted from the monomer composition of the interpolymer solids.

The latices of the invention, particularly when adjusted to a pH of about 8–12 and preferably 8–10, have a much higher viscosity than conventional prior art latices. The high viscosities of these latices make them particularly suitable for coating and/or impregnating applications such as coating paper, impregnating glass fiber mats, etc.

In rendering the latices alkaline to increase their viscosity, it is possible to use permanent alkalies such as sodium carbonate, sodium hydroxide, etc. Preferably, however, volatile nitrogenous bases should be used for this purpose. Examples of such bases include ammonia and amines having atmospheric boiling points not higher than about 175° C., e.g., mono-, di- and tri-methylamines, propylamine, ethanolamine, isopropanolamine, etc.

To prepare the protective coating compositions of the invention, the latices of the invention will be adjusted to a pH of about 8–12 and will have dispersed therein pigments of the type customarily employed in the formulation of latex-based coating compositions. Typical examples of such pigments include clay, magnesium, silicate, iron oxide, barium sulfate, titanium dioxide, phthalocyanine blue, etc. Carbonate pigments such as calcium carbonate can under some conditions of storage react with the carboxyl groups of the latex and, consequently, preferably should not be included in the coating compositions. The coating compositions of this invention, however, because of their high viscosity, do not require the addition of the customarily used thickeners such as cellulosic ethers, water-soluble gums, etc. By the proper selection of the type and quantity of pigments, it is possible to prepare coating compositions which dry to form flat, semiglossy and/or glossy films. Multi-component coating compositions which contain a latex of this invention as one component dry to form exceptionally hard and durable films. Such compositions are disclosed and claimed in co-pending application Ser. No. 166,368, filed Jan. 15, 1962, now abandoned, and assigned to the assignee of the present application. If desired, the coating compositions of the invention can be formulated to include therein additional film-forming components such as conventional latices, oil-modified alkyd resins, drying oils, etc.

The coating compositions of this invention can be applied by conventional techniques to protect metal, e.g., steel, copper and aluminum, plaster, wooden, plastic and like surfaces.

The above descriptions and particularly the examples are set forth for purposes of illustration only. Many variations and modifications thereof will be apparent to those skilled in the art and can be made without departing from the spirit and scope of the invention herein described.

What is claimed is:

1. An aqueous latex prepared by the aqueous emulsion polymerization of a monomer mixture of (A) from about 5.5 to 20 percent by weight of an alpha,beta-ethylenically unsaturated carboxylic acid and (B) at least one vinylidene monomer which is interpolymerizable therewith, in which polymerization the addition of at least a portion of the acid monomer to the emulsion is delayed until at least 70 percent by weight of the total weight of monomers have polymerized; said acid monomer constituting from 18 to 75 percent by weight of the remaining monomers so added to the emulsion; said polymer particles having an average particle size of from 0.01 to 1.0 micron.

2. An aqueous latex as in claim 1 wherein the acid monomer is selected from the group consisting of acrylic acid, methacrylic acid, and mixtures thereof.

3. An aqueous latex as in claim 1 wherein (B) is at least 50 percent by weight styrene based on total monomers (B).

References Cited

UNITED STATES PATENTS

| | | | |
|---|---|---|---|
| 2,767,153 | 10/1956 | Sutton | 260—29.6 |
| 2,859,201 | 11/1958 | Uraneck et al. | 260—29.7 |
| 2,962,465 | 11/1960 | Lindstrom et al. | 260—29.6 |
| 3,073,791 | 1/1963 | Barkhuff | 260—29.6 |
| 3,296,175 | 1/1967 | Fantl et al. | 260—29.6 |

FOREIGN PATENTS 233,298  3/1961  Australia.

DONALD E. CZAJA, *Primary Examiner.*
R. W. GRIFFIN, *Assistant Examiner.*